(No Model.)

W. KLINE.
CLAMP.

No. 521,658. Patented June 19, 1894.

WITNESSES:
F. L. Ourand
W. L. Coombs

INVENTOR:
Wm. Kline,
G. Lauis Taggart
Attorneys.

UNITED STATES PATENT OFFICE.

WILLIAM KLINE, OF PIQUA, OHIO.

CLAMP.

SPECIFICATION forming part of Letters Patent No. 521,658, dated June 19, 1894.
Application filed January 17, 1894. Serial No. 497,177. (No model.)

*To all whom it may concern:*

Be it known that I, WILLIAM KLINE, a citizen of the United States, and a resident of Piqua, in the county of Miami and State of Ohio, have invented certain new and useful Improvements in Clamps; and I do hereby declare that the following is a full, clear, and exact description of the invention, which will enable others skilled in the art to which it appertains to make and use the same, reference being had to the accompanying drawings, which form a part of this specification.

My invention relates to improvements in clamps designed more especially for connecting and holding together the walls or panels of knock-down wardrobes, although it may be used with advantage for many other analogous purposes.

The invention consists in the novel construction and combination of parts hereinafter fully described and claimed.

Figure 1:
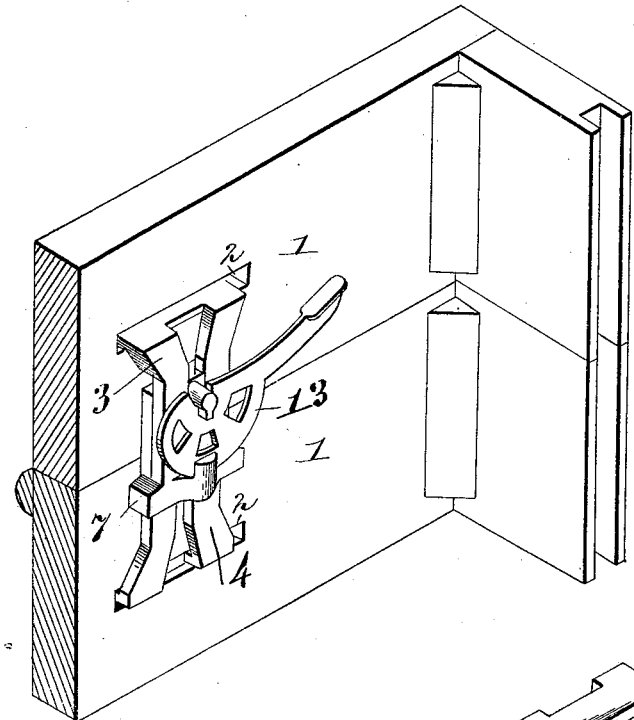
Figure 2:
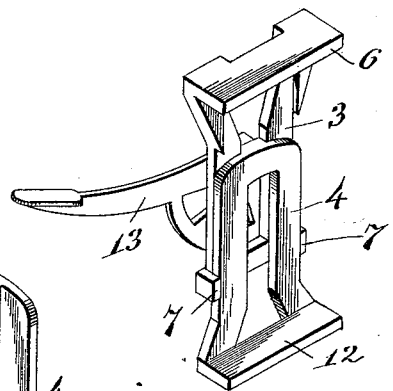
Figure 3:
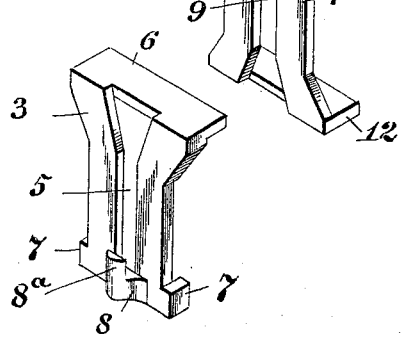
Figure 4:
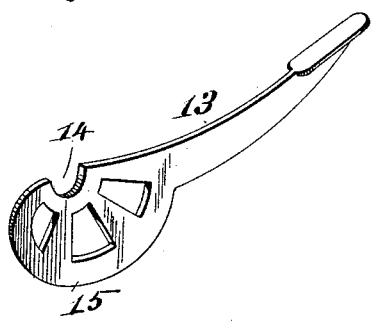

In the accompanying drawings: Figure 1 is a perspective view of a portion of a knock-down wardrobe showing my invention applied thereto. Fig. 2 is a perspective view of the clamp looking from the opposite side. Fig. 3 shows in perspective the two sliding plates disconnected from each other. Fig. 4 is a similar view of the cam lever.

In the said drawings, the reference numeral 1 designates two top walls or panels of a knock-down wardrobe, each provided with a horizontal slot 2.

The numerals 3 and 4 designate two clamping plates, which are slidable upon each other. The plate 3 is formed with a long slot 5, and at its outer end provided with a beveled flange 6. At its opposite or inner end it is formed with two studs 7, 7, one at each side. It is also formed at its inner end at the center thereof, with a lug 8 having an upwardly extending projection 8ª. The other plate 4, is formed with a slot 9, a lug 10 at its inner end and a beveled flange 12, at its outer end. This lug at its outer end is provided with a downwardly extending projection 14ª, for holding the lever hereinafter described thereon.

The numeral 13 designates a lever having a semi-circular notch or recess 14 and a cam head 15.

The operation of the clamp is as follows: The two plates 3 and 4 are placed upon each other with the lug 10 of plate 4, passing through the slot in plate 3, and with studs 7, of plate 3 engaging with the side edges of plate 4, as seen in Fig. 2, the beveled flanges on said plates both projecting in the same direction. The notch in the lever 13 is then engaged with the lug 10, and the said flanges in the plates 3 and 4, inserted in the slots 2 of the walls or panels 1. By now turning the lever as seen in Fig. 1, the cam head will engage with lug 8, forcing said plates together and firmly clamping the parts with which they are connected together. It is not necessary for the working of the clamp that plate 4 should be slotted, but I prefer to do so for the purpose of lessening the weight and saving metal.

From the above it will be seen that none of the parts comprising the clamp are positively connected together, yet when operated to clamp two parts of a wardrobe together, they are securely connected, without the slightest liability of their being accidentally disconnected. The lugs or projections 8ª and 14ª, securely hold the lever in place, yet when the latter is operated to unclamp the device, the parts will fall apart.

While the invention is primarily intended for use in connection with wardrobes, it may be employed with advantage by carpenters and joiners for clamping pieces of wood together when desirable.

Having thus described my invention, what I claim is—

The combination with the plate 3, having slot 5, a flange 6 at its outer end, lugs 7, 7, at its side edges and a central lug 8, at its inner end provided with an upwardly extending projection 8ª, of the plate 4, having a flange 12 at its outer edge and a lug 10 at its inner end provided with a downwardly extending projection 14ª, and the lever having a notch 14 and a cam head 15, substantially as and for the purpose specified.

In testimony that I claim the foregoing as my own I have hereunto affixed my signature in presence of two witnesses.

WILLIAM KLINE.

Witnesses:
LOUIS A. LENT,
J. H. HATCH.